US009405795B2

(12) United States Patent
Imaki

(10) Patent No.: US 9,405,795 B2
(45) Date of Patent: Aug. 2, 2016

(54) STREAM DATA PROCESSING SERVER AND A NON-TRANSITORY COMPUTER-READABLE STORAGE MEDIUM STORING A STREAM DATA PROCESSING PROGRAM

(75) Inventor: Tsuneyuki Imaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 14/003,838

(22) PCT Filed: Jul. 20, 2011

(86) PCT No.: PCT/JP2011/066408
§ 371 (c)(1),
(2), (4) Date: Sep. 9, 2013

(87) PCT Pub. No.: WO2013/011569
PCT Pub. Date: Jan. 24, 2013

(65) Prior Publication Data
US 2013/0346441 A1    Dec. 26, 2013

(51) Int. Cl.
*G06F 17/30* (2006.01)
*G06Q 30/02* (2012.01)
*H04L 12/24* (2006.01)
(Continued)

(52) U.S. Cl.
CPC .... *G06F 17/30424* (2013.01); *G06F 17/30286* (2013.01); *G06F 17/30595* (2013.01); *G06F 17/30864* (2013.01); *G06F 17/30867* (2013.01); *G06Q 30/02* (2013.01); *H04L 41/147* (2013.01);
(Continued)

(58) Field of Classification Search
CPC ............... G06F 17/30424; G06F 17/30864; G06F 17/30867; G06F 17/30286; G06F 17/30595; G06Q 30/02

USPC ............................................. 707/707, 769
See application file for complete search history.

(56) References Cited

U.S. PATENT DOCUMENTS

| 8,495,082 B2 * | 7/2013 | Kashiyama et al. | .......... 707/769 |
| 2006/0149744 A1 * | 7/2006 | Das | ..................... H04L 67/2819 |

(Continued)

FOREIGN PATENT DOCUMENTS

| JP | 2010/108073 A | 5/2010 |
| JP | 2010-108152 A | 5/2010 |
| JP | 2010-272022 A | 12/2010 |

OTHER PUBLICATIONS

Tadashi Mano, "Ubiquitous Jidai no DB Modeling, Data Administration & Data modeling", Solution IT, vol. 16, No. 2, Feb. 1, 2004, pp. 44-48.

*Primary Examiner* — Pierre Vital
*Assistant Examiner* — Andrew N Ho
(74) *Attorney, Agent, or Firm* — Mattingly & Malur, PC

(57) ABSTRACT

A stream data processing server for processing stream data comprising a stream data processing module for cutting the plurality of pieces of data that are included within a processing range as a target out of the stream data by using a sliding window, and executing analyzing processing for the cut out plurality of pieces of data, the stream data processing module having an approximate expression; the approximate expression calculating module being configured to: determine one of the time stamps of the cut out plurality of pieces of data as a time origin; modify the time stamps of the cut out plurality of pieces of data to relative time values in relation to the determined time origin; and use the modified time stamps and the values of the plurality of pieces of data to calculate the approximate expression.

10 Claims, 8 Drawing Sheets

(51) Int. Cl.
*H04N 21/647* (2011.01)
*H04N 21/845* (2011.01)
*H04N 21/8547* (2011.01)

(52) U.S. Cl.
CPC ........ *H04N 21/6473* (2013.01); *H04N 21/8456* (2013.01); *H04N 21/8547* (2013.01)

(56) References Cited

U.S. PATENT DOCUMENTS

| | | | |
|---|---|---|---|
| 2006/0277230 A1* | 12/2006 | Nishizawa et al. | 707/204 |
| 2006/0288045 A1* | 12/2006 | Raz | 707/200 |
| 2007/0288459 A1* | 12/2007 | Kashiyama | G06F 17/30286 |
| 2008/0114787 A1* | 5/2008 | Kashiyama et al. | 707/100 |
| 2009/0192882 A1* | 7/2009 | Narahashi | G06Q 30/02 705/7.29 |
| 2009/0228645 A1* | 9/2009 | Kitamura | 711/112 |
| 2010/0106710 A1* | 4/2010 | Nishizawa et al. | 707/714 |
| 2011/0029554 A1* | 2/2011 | Ito et al. | 707/769 |
| 2011/0066600 A1* | 3/2011 | Cormode et al. | 707/689 |
| 2011/0125778 A1* | 5/2011 | Kubo | 707/769 |
| 2013/0173587 A1 | 7/2013 | Imaki et al. | |
| 2013/0346441 A1* | 12/2013 | Imaki | G06F 17/30424 707/769 |

\* cited by examiner

STREAM DATA PROCESSING SERVER AND A NON-TRANSITORY COMPUTER-READABLE STORAGE MEDIUM STORING A STREAM DATA PROCESSING PROGRAM

BACKGROUND OF THE INVENTION

This invention relates to stream data analyzing processing. More particularly, this invention relates to processing of analyzing stream data with the use of an approximate expression.

In recent years, along with the increase in the amount of data to be processed, stream data processing systems that allow real-time data compilation and real-time data analysis are attracting attention. Stream data processing systems process stream data, which is a string of time-series data arriving consecutively.

Stream data processing systems execute data processing in accordance with a query defined in advance. A query is a scenario indicating data to be processed and the specifics of the processing, and is written in Continuous Query Language (CQL).

Stream data keeps arriving consecutively without a break, which makes it necessary to extract data about which computation is performed. Processing of analyzing stream data therefore uses sliding window in order to cut a finite data set out of stream data.

There are roughly two types of sliding window, specifically, count-based sliding window for holding n pieces of time-series data that precede a processing target time, and time-based sliding window for holding n hours of time-series data that precede a processing target time.

By using sliding window, for example, count-based sliding window, n pieces of input information preceding an arbitrary time can be compiled and analyzed in substantially real time. Stream data processing systems therefore enable one to analyze the state at the current time and deal with a future data change that is predicted.

In stream data processing systems, a computer that processes stream data uses sliding window to cut out time-series data, and analyzes the relation between a time and a target value (metrics) with respect to the cut out time-series data. This computer calculates a time-metrics relational expression (approximate expression) as the result of the analysis. A future change in value can thus be predicted.

The least square method is known as a method of calculating a relational expression of the relation between a time and a target value. For example, in the case of using count-based sliding window for extracting n pieces of time-series data to approximate the relation between a time $x_i$ and metrics $y_i$ with a linear expression "y=ax+b", the values of the coefficients a and b are respectively calculated by Expression (1) and Expression (2), where i is a natural number indicating the place in the order of the time-series data.

$$a = \frac{n\Sigma x_i y_i - \Sigma x_i \Sigma y_i}{n\Sigma x_i^2 - (\Sigma x_i)^2} \quad (1)$$

$$b = \frac{\Sigma x_i^2 \Sigma y_i - \Sigma x_i y_i \Sigma x_i}{n\Sigma x_i^2 - (\Sigma x_i)^2} \quad (2)$$

Expression (1) and Expression (2) are solutions of an equation expressed as Expression (3).

$$\begin{pmatrix} \Sigma x_i^2 & \Sigma x_i \\ \Sigma x_i & \Sigma 1 \end{pmatrix} \begin{pmatrix} a \\ b \end{pmatrix} = \begin{pmatrix} \Sigma x_i y_i \\ \Sigma y_i \end{pmatrix} \quad (3)$$

SUMMARY OF THE INVENTION

In stream data processing systems where time-series data is processed continuously, when a long period of time elapses, in other words, when the value of the time x is large, the value of each term (the respective sums and products thereof) in Expression (1) and Expression (2) is large. Consequently, the computer undergoes a digit overflow in integer representation. Use of a floating point in order to prevent a digit overflow causes digit cancellation in turn.

An object of this invention is to provide a stream data processing system capable of calculating an approximate expression at a lower calculation cost while preventing a digit overflow even when the time has a large value.

The present invention can be appreciated by the description which follows in conjunction with the following figures, wherein: a stream data processing server for processing stream data, which arrives consecutively from a computer system as a monitoring target, comprising: a processor; a memory coupled to the processor; a storage medium coupled to the processor; and an interface coupled to the processor, for coupling to other devices. The stream data including a plurality of pieces of data to which time stamps are added. The stream data processing server further comprising a stream data processing module for cutting the plurality of pieces of data that are included within a processing range as a target out of the stream data by using a sliding window in accordance with a query registered in advance, and executing analyzing processing for the cut out plurality of pieces of data. The stream data processing module having: an approximate expression calculating module for calculating, by using the cut out plurality of pieces of data, an approximate expression that indicates an association relation between the time stamps and values of the plurality of pieces of data; and an anomaly detecting module for calculating predicted values of the plurality of pieces of data by using the calculated approximate expression, and predicting an anomaly in the computer system based on the calculated predicted values. The approximate expression calculating module being configured to: determine one of the time stamps of the cut out plurality of pieces of data as a time origin; modify the time stamps of the cut out plurality of pieces of data to relative time values in relation to the determined time origin; and use the modified time stamps and the values of the plurality of pieces of data to calculate the approximate expression.

According to a mode of this invention, a digit overflow is prevented in the calculation of an approximate expression by modifying the time stamp of data cut out with the use of sliding window as the origin of the time is modified.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Figure 1:
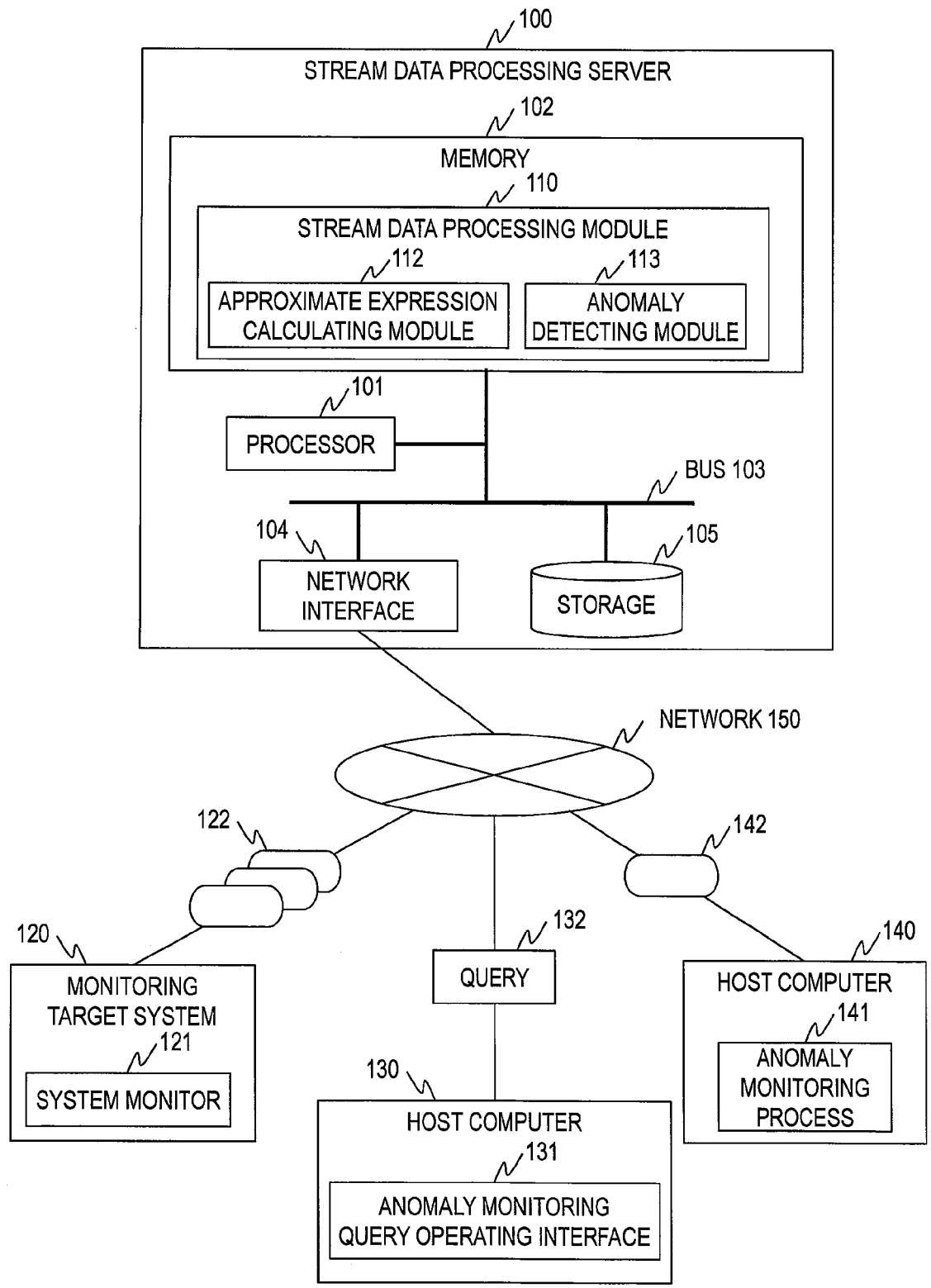
FIG. 1 is a block diagram illustrating a configuration example of a stream data processing system in an embodiment of this invention.

FIG. 1 is a block diagram illustrating a configuration example of a stream data processing system in an embodiment of this invention.

The stream data processing system includes a stream data processing server 100, a monitoring target system, and a plurality of host computers, here, 130 and 140.

The stream data processing server 100 is coupled via a network 150 to the monitoring target system, which is denoted by 120, and the plurality of host computers, 130 and 140. The network 150 can be a WAN, a LAN, or the like. However, this invention is not limited by the format of network connection.

The stream data processing server 100 receives stream data transmitted from the monitoring target system 120, and processes the stream data in accordance with a specified query. The stream data includes a plurality of pieces of data 122 organized in time series.

The stream data processing server 100 includes a processor 101, a memory 102, a network interface 104, and storage 150, which are connected via a bus 103.

The processor 101 executes various types of processing by executing a program that is stored in the memory 102.

The memory 102 stores a program executed by the processor 101 and information necessary to execute the program. Specifically, the memory 102 is provided with a stream data processing module 110.

The stream data processing module 110 processes stream data. At the start of the processing, the stream data processing module 110 reads a query group definition stored in the storage 105, and configures a query graph based on the read query group definition. The stream data processing module 110 executes the processing in accordance with the query graph.

The stream data processing module 110 includes an approximate expression calculating module 112 and an anomaly detecting module 113.

The approximate expression calculating module 112 executes processing of analyzing the plurality of pieces of data 122 cut out by sliding window to calculate an approximate expression. Data cut out by sliding window is hereinafter also referred to as target data, and sliding window is hereinafter referred to as window.

The anomaly detecting module 113 uses the calculated approximate expression to detect an anomaly in the monitoring target system 120, and to predict an anomaly as well. For instance, the anomaly detecting module 113 uses the approximate expression to calculate a predicted value of metrics, and determines whether or not the predicted value is equal to or larger than a given threshold.

In the following description of processing, when a sentence has the approximate expression calculating module 112 or the anomaly detecting module 113 as the subject, it means that a program implementing the module 112 or the module 113 is being executed by the processor 101.

The functions of the approximate expression calculating module 112 and the anomaly detecting module 113 may be implemented by hardware.

The network interface 104 is an interface for coupling to the network 150.

The storage 105 stores stream data (the data 122), a query 132, and other types of information. Examples of the storage 105 include an HDD, an SSD, and similar storage media. This invention is not limited by the type of storage media.

The monitoring target system 120 is a computer system constituted of a plurality of computers (not shown). A system monitor 121 for monitoring data (metrics) to be monitored is executed on the computers (not shown) constituting the monitoring target system 120.

The system monitor 121 collects necessary data from the computers (not shown) constituting the monitoring target system 120, and generates the data 122 from the collected data. The system monitor 121 transmits the generated data 122 to the stream data processing server 100.

The host computers 130 and 140 are computers used by users of the stream data processing server 100, and includes a processor (not shown), a memory (not shown), and a network interface (not shown).

A program for implementing an anomaly monitoring query operating interface 131 is executed on the host computer 130. The anomaly monitoring query operating interface 131 is an interface for registering the query 132, anomaly monitoring query 132 to be exact, and for commanding the execution of the anomaly monitoring query 132.

In a case where the anomaly monitoring query 132 is input, the stream data processing server 100 analyzes the anomaly monitoring query 132 to configure a query graph for executing stream data processing. The stream data processing server 100 processes stream data in accordance with the query graph.

An anomaly monitoring process 141 is executed on the host computer 140. The anomaly monitoring process 141 is a process for displaying a processing result to the user based on a result 142, which is transmitted from the stream data processing server 100, in order to notify of an error or the like.

Alternatively, the provision of the anomaly monitoring query operating interface 131 and the execution of the anomaly monitoring process 141 may be handled by a single computer.

A conventional approximation method using the least square method is described first.

Figure 2:
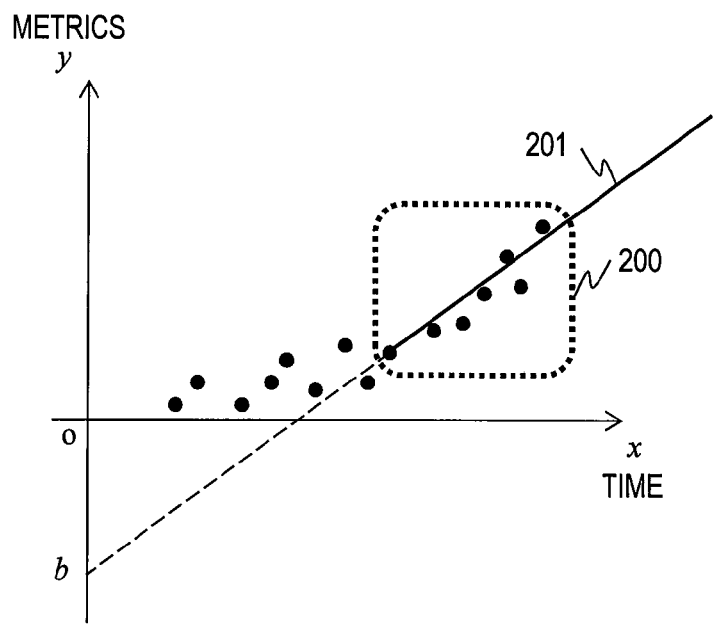
FIG. 2 and FIG. 3 are explanatory diagrams showing an example of a conventional approximation method using the least square method.
Figure 3:
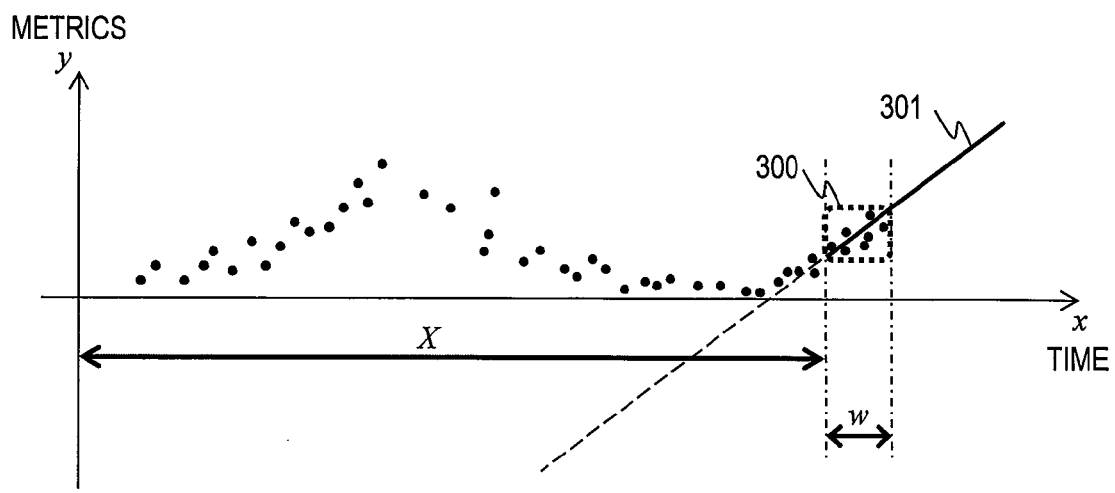

FIG. 2 and FIG. 3 are explanatory diagrams showing an example of the conventional approximation method using the least square method. An approximation method of a linear expression is described below.

In FIGS. 2 and 3, a horizontal axis x represents time and a vertical axis y represents metrics. Examples of the metrics include the utilization ratio of a processor to be monitored and the utilization ratio of the network bandwidth. A time means a time stamp added to data.

In FIG. 2, in a case where the least square method is applied to the seven pieces of target data cut out by a count-based window 200, a linear expression such as a line 201 is calculated as the approximate expression. In FIG. 3, in a case where the least square method is applied to the seven pieces of target data cut out by a count-based window 300, a linear expression such as a line 301 is calculated as the approximate expression.

The coefficients a and b can be calculated by Expression (1) and Expression (2). As can be seen in Expression (1) and Expression (2), calculating the coefficients a and b involves obtaining the values of Expression (4) to Expression (7).

$$S_x(t) = \sum_{i=0}^{n-1} x_i \quad (4)$$

$$S_y(t) = \sum_{i=0}^{n-1} y_i \quad (5)$$

$$S_{x2}(t) = \sum_{i=0}^{n-1} x_i^2 \quad (6)$$

$$S_{yx}(t) = \sum_{i=0}^{n-1} x_i y_i \quad (7)$$

Values expressed by Expression (4) to Expression (7) are each hereinafter referred to as value S(t) when there is no need to distinguish one from another.

However, the calculation method described above has the following problems.

A first problem is that, when an absolute value X of the time is significantly greater than a time difference w (w<<X) as shown in FIG. 3, a difference in time value between pieces of data within the window ends up being a relatively meaningless value. The values of the coefficients a and b therefore cannot be calculated correctly.

This corresponds to the case where an increase in the value of the time x raises the number of digits of the values of Expression (4) to Expression (7) and consequently causes a digit overflow.

Thus in this invention, the time origin is moved with sliding the window. Specifically, the approximate expression calculating module 112 first determines the time stamp of one piece of data 122 out of the cut out pieces of data 122 as the origin. The approximate expression calculating module 112 next modifies the time stamps of the cut out pieces of data 122 to relative times in relation to the modified origin. Expression (4) to Expression (7), too, are changed through the time stamp modifying processing described above.

In the case where a time stamp $x_t$ of an arbitrary piece of data is determined as the time origin, for example, Expression (4) to Expression (7) are transformed into Expression (8) to Expression (11). In short, the first problem is solved by using relative times.

$$S_x(t) = \sum_{i=t-n+1}^{t} (x_i - x_t) \quad (8)$$

$$S_y(t) = \sum_{i=t-n+1}^{t} y_i \quad (9)$$

$$S_{x2}(t) = \sum_{i=t-n+1}^{t} (x_i - x_t)^2 \quad (10)$$

$$S_{yx}(t) = \sum_{i=t-n+1}^{t} (x_i - x_t) y_i \quad (11)$$

When Expression (8) to Expression (11) are applied, Expression (1) and Expression (2) can be expressed as Expression (12) and Expression (13).

$$a(t) = \frac{n S_{yx}(t) - S_x(t) S_y(t)}{n S_{x2}(t) - S_x(t)^2} \quad (12)$$

$$b(t) = \frac{S_{x2}(t) S_y(t) - S_{yx}(t) S_x(t)}{n S_{x2}(t) - S_x(t)^2} \quad (13)$$

Figure 4A:
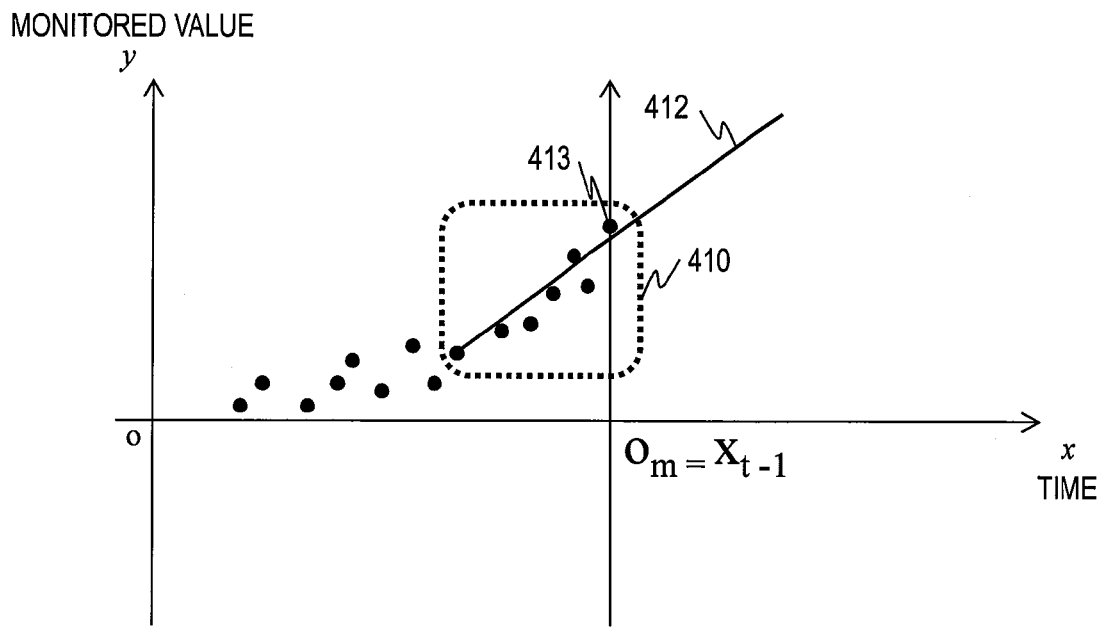
FIGS. 4A and 4B are explanatory diagrams showing an example of an approximation method that uses the least square method in the embodiment of this invention.
Figure 4B:
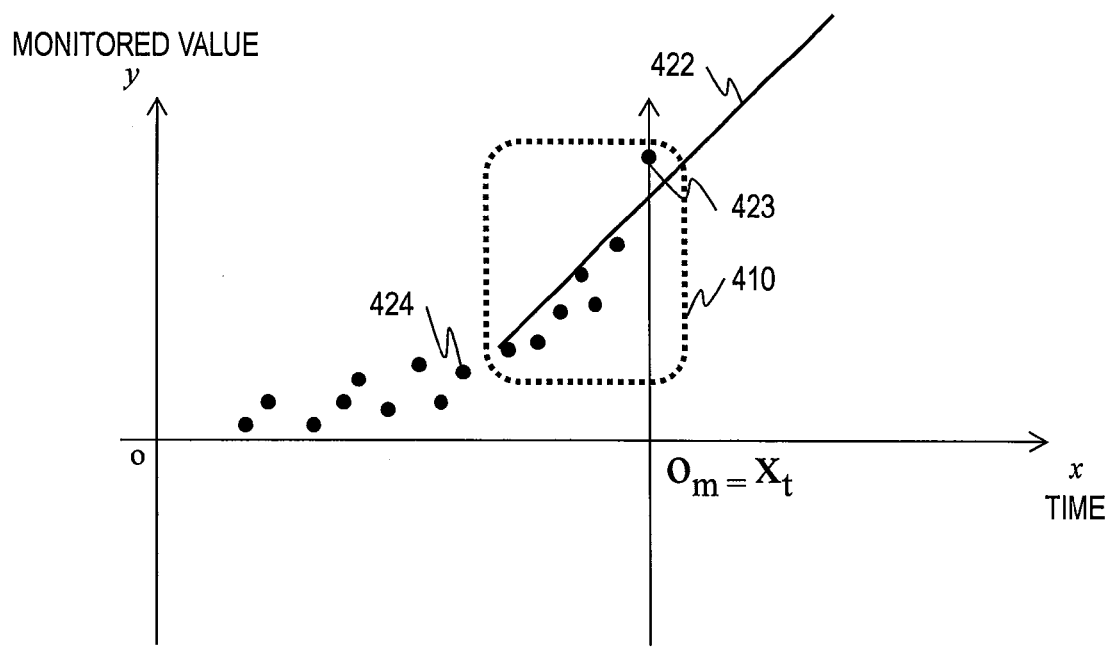

FIGS. 4A and 4B are explanatory diagrams showing an example of an approximation method that uses the least square method in the embodiment of this invention.

The approximate expression calculating module 112 sets the time stamp of latest data 411 within a window 410 as the origin.

In the example of FIGS. 4A and 4B, a time origin $O_m$ before the window 410 is slid is the time stamp $X_{t-1}$ of data 413. With the sliding of the window 410, the origin $O_m$ is moved to a time stamp $X_t$ of data 423. Data 424 is deleted as the window is slid.

How the origin is determined in this invention is not limited to the one described above, and any time stamp within the window 410 can be set as the origin.

Expression (4) to Expression (7) in this case are expressed as Expression (8) to Expression (11). A digit overflow of Expression (4) to Expression (7) due to an increase in the absolute value of the time can be avoided as a result. The first problem can thus be solved by moving the time origin.

However, there is a second problem in that an increase in window size raises the cost of calculating Expression (8) to Expression (11).

Thus in this invention, an incremental calculation method is used, that uses a value S(t) calculated before the window is slid to obtain a value S(t) calculated next. Specifically, Expression (8) to Expression (11) are transformed into Expression (14) to Expression (17).

$$S_x(t) = S_x(t-1) + d_t - z_t \quad (14)$$

$$S_{x2}(t) = S_{x2}(t-1) + 2 d_t S_x(t-1) + n d_t^2 - z_t^2 \quad (15)$$

$$S_{yx}(t) = S_{yx}(t-1(+d_t S_y(t-1) - z_t y_{t-n}) \quad (16)$$

$$S_y(t) = S_y(t-1) + y_t - y_{t-n} \quad (17)$$

Symbols $d_t$ and $z_t$ are values indicating time differences, and are defined by Expression (18) and Expression (19).

$$d_t = x_{t-1} - x_t \quad (18)$$

$$z_t = x_{t-n} - x_t \quad (19)$$

In the case where old data is not deleted with the sliding of the window, $z_t$ in Expression (12) is "0".

In this embodiment, the value S(t) is treated as a state value. This eliminates the need to execute SUM calculation of Expression (8) to Expression (11) in order to calculate the value S(t), and solves the second problem.

When carrying out the incremental calculation method, a third problem arises in that the updated value S(t) needs to be treated as an input again. In other words, the method necessitates recursive computation processing in which the updated value is used as a new input to calculate the next updated value. However, performing recursive computation with simple loop processing means that the calculation processing never converges due to concurrent input and output, which makes carrying out recursive computation processing difficult.

Thus in this invention, a time difference is generated between data inputting processing and data updating processing. A feature of this invention is that component modules of the approximate expression calculating module 112 are configured so that a time difference is generated between data inputting processing and data updating processing.

Figure 5:
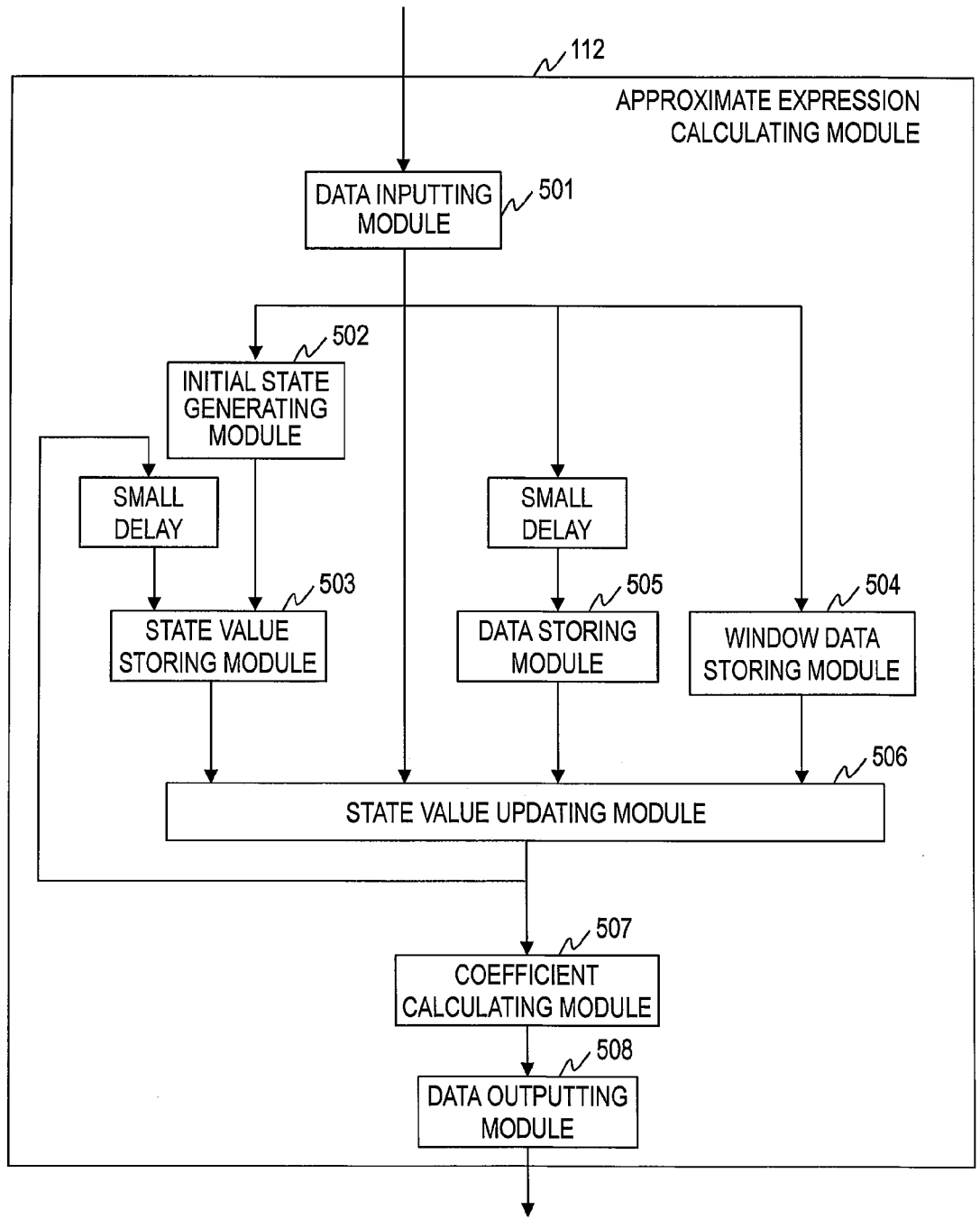
FIG. 5 is an explanatory diagram illustrating a configuration of an approximate expression calculating module according to the embodiment of this invention

FIG. 5 is an explanatory diagram illustrating the configuration of the approximate expression calculating module 112 according to the embodiment of this invention.

The approximate expression calculating module 112 includes a data inputting module 501, an initial state generating module 502, a state value storing module 503, a window data storing module 504, a data storing module 505, a state value updating module 506, a coefficient calculating module 507, and a data outputting module 508.

The data inputting module 501 receives an input of target data. Target data is input in a time stamp-metrics format. In other words, target data in an (x, y) format is input.

In this invention where incremental processing is executed, target data is input to the data inputting module 501 in time series one piece at a time.

The initial state generating module 502 generates an initial value S(0) of the state value and outputs the generated initial value S(0), in a case where target data is input to the approximate expression calculating module 112 for the first time. Specifically, the initial values of Expression (8) to Expression (11) are "0".

The state value storing module 503 stores the state value S(t). In a case where target data is input for the first time, the state value storing module 503 stores the initial value S(0).

The window data storing module 504 stores target data cut out by the window. The window data storing module 504 also executes data updating processing as the window is slid. Specifically, the following processing is executed.

The window data storing module 504 determines whether or not there is data to be deleted from a window as the window is slid. In other words, the window data storing module 504 determines whether or not there is target data that moves out of a window with the sliding of the window.

In the case where there is data to be deleted from the window, the window data storing module 504 outputs the data to the state value updating module 506. Data to be deleted as a window is slid is hereinafter also referred to as expired data.

In the case of count-based sliding window, the timing of inputting target data and the timing of inputting expired data are the same. In the case of time-based sliding window, on the other hand, the timing of inputting target data and the timing of inputting expired data differ from each other. Processing of the window data storing module 504 therefore varies depending on whether count-based sliding window or time-based sliding window is used. The concrete specifics of the processing are described later with reference to FIGS. 6 and 8.

The data storing module 505 stores target data that is used to calculate the state value S(t). The target data stored in the data storing module 505 is one that immediately precedes target data received by the data inputting module 501 in time-series order. For example, in a case where the data inputting module 501 receives target data ($x_6$, $y_6$), the data storing module 505 stores target data ($x_5$, $y_5$).

The state value updating module 506 uses Expression (14) to Expression (17) to calculate the state values S(t), in a case where values are input from the respective component modules.

Updating processing differs for count-based sliding window and time-based sliding window. This is because the timing of inputting target data and the timing of inputting expired data differ from each other. Details of the processing executed by the state value updating module 506 are described later with reference to FIGS. 6 and 8.

The coefficient calculating module 507 substitutes the state values S(t) in Expression (12) and Expression (13) to calculate the coefficients a and b, in a case where the state values S(t) calculated by the state value updating module 506 are input.

The data outputting module 508 generates an approximate expression based on the calculated coefficients a and b, and outputs the generated approximate expression to the anomaly detecting module 113.

The state value storing module 503, the window data storing module 504, and the data storing module 505 have a function of storing data in the storage area of the memory 102.

The data flow of the approximate expression calculating module 112 is described below.

When target data is input, the data inputting module 501 outputs the target data to the initial state generating module 502, the window data storing module 504, the data storing module 505, and the state value updating module 506.

The data output to the data storing module 505 has a small delay caused by the data inputting module 501.

In the case where target data is input for the first time, the initial state generating module 502 generates the initial state value S(0), and outputs the generated initial state value S(0) to the state value storing module 503.

The data storing module 505 outputs currently stored target data to the state value updating module 506 and, after the short time elapses, stores new target data. This allows the data storing module 505 to hold target data that immediately precedes input target data in time-series order in a case where processing is executed for the input target data.

The state value storing module 503 outputs the currently stored state values S(t) to the state value updating module 506.

The state value updating module 506 substitutes values input from the data inputting module 501, the state value storing module 503, the window data storing module 504, and the data storing module 505 in Expression (14) to Expression (17) to calculate state values S(t+1), which indicate a state after the window is slid. The state value updating module 506 outputs the calculated state values S(t+1) to the state value storing module 503 and the coefficient calculating module 507.

The updated values S (t+1) output to the state value storing module 503 have a small delay caused by the state value updating module 506. In other words, the state value storing module 503 is updated with the state values S(t+1) after the short time elapses.

This is because, if the updated values S(t+1) are input to the state value storing module 503 without a delay, new updated values S(t+1) are calculated with the updated values S(t+1) as an input, which gives rise to a problem in that the computation processing never converges.

This invention therefore involves causing a small delay in order to maintain consistency between input and output.

By providing a small delay in a case where data is input to the state value storing module 503 and the data storing module 505 as described above, recursive processing can be carried out.

The data flow of the approximate expression calculating module 112 is accomplished by a recursive query described in Japanese Patent Application Laid-open No. 2010-108152.

The micro time only needs to be a shorter length of time than the time precision of the time stamp. For instance, when the time stamp has a time precision of 1 millisecond, a delay of 1 microsecond or 1 nanosecond is sufficient.

The processing flows of the respective component modules are described next. Count-based sliding window and time-based sliding window have different processing procedures, which are described separately. The processing procedure for count-based sliding window is described first.

In the case of count-based sliding window, the timing at which target data is input and the timing at which data turns into expired data are the same. However, no data turns into expired data, in a case where the count of pieces of target data cut out by a count-based window is equal to or less than a data count set to the count-based window.

The state value updating module 506 therefore needs to vary the calculation expression for the case where expired data is input and for the case where expired data is not input.

Figure 6:
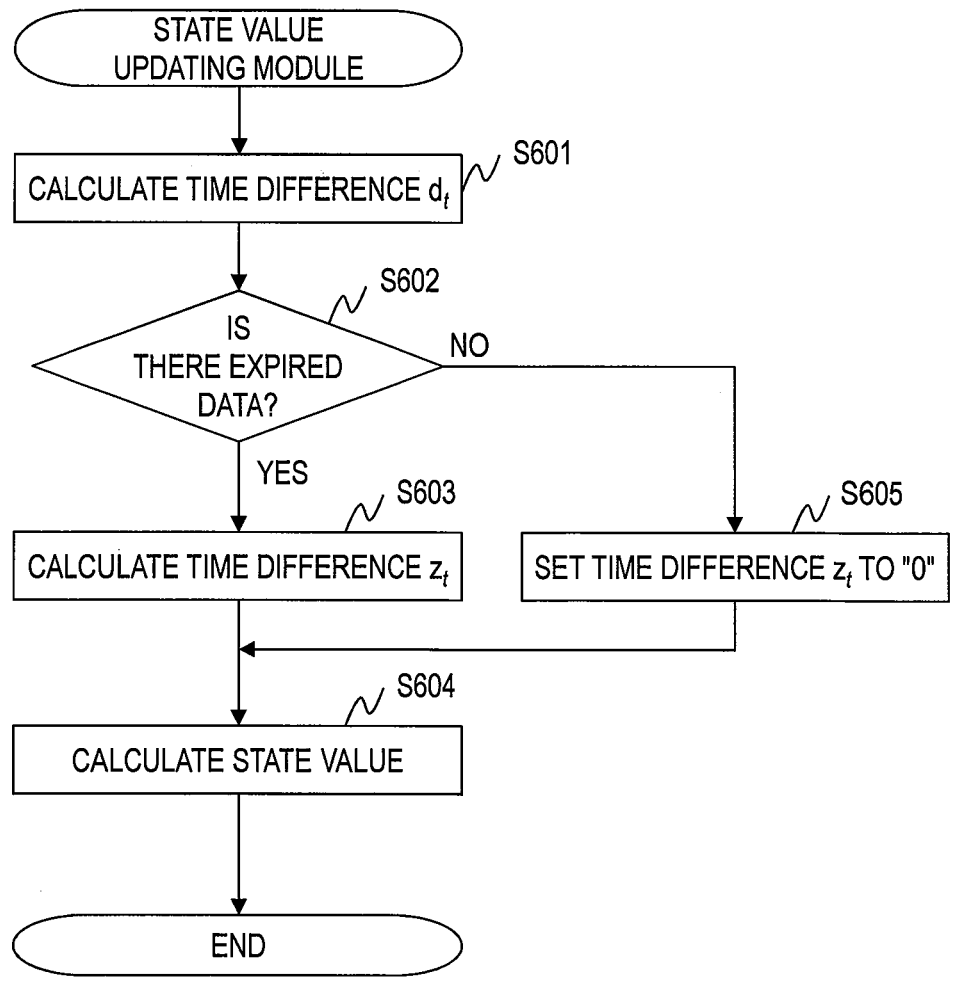
FIG. 6 is a flow chart illustrating processing that is executed by a state value updating module according to the embodiment of this invention.

FIG. 6 is a flow chart illustrating processing that is executed by the state value updating module 506 according to the embodiment of this invention.

In a case where target data is input from the data inputting module 501, the state value updating module 506 first calculates the time difference $d_t$ (Step S601).

The state value updating module 506 next determines whether or not there is expired data (Step S602).

Specifically, the state value updating module 506 determines whether or not expired data has been input from the window data storing module 504. In the case where expired data has been input, it is determined that there is expired data.

Determining that there is expired data, the state value updating module 506 calculates the time difference $z_t$ (Step S603).

In the case where it is determined that there is no expired data, the state value updating module 506 sets the time difference $z_t$ to "0" (Step S605).

The state value updating module 506 substitutes values input from the respective component modules in Expression (14) to Expression (17) to calculate the respective state values (Step S604), and ends the processing.

The timing of updating data in the approximate expression calculating module 112 is described next.

Figure 7:
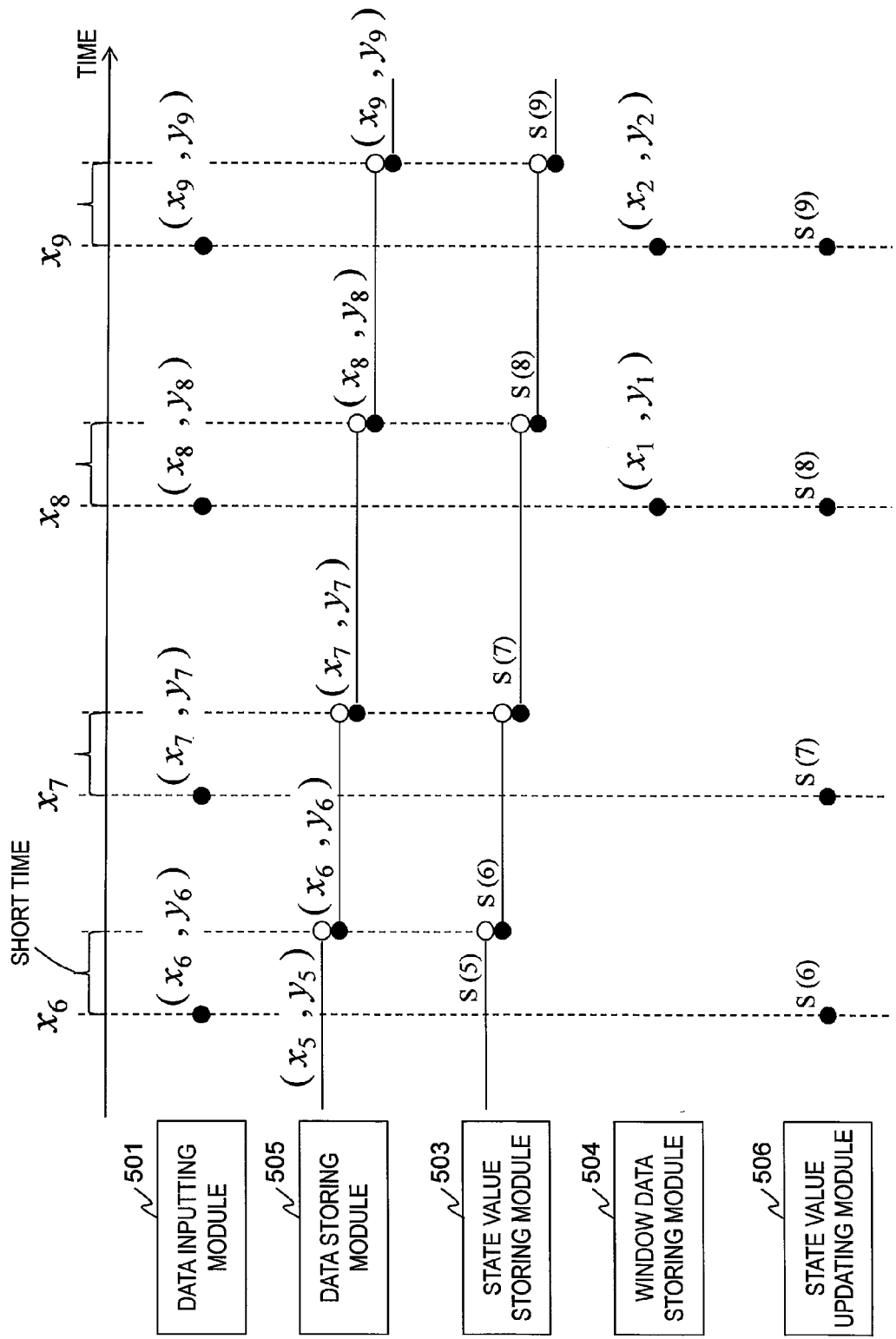
FIG. 7 takes as an example a case of a count-based window for cutting out seven pieces of data.

FIG. 7 is an explanatory diagram illustrating respective data updating timing of the component modules of the approximate expression calculating module 112 according to the embodiment of this invention.

FIG. 7 takes as an example a case of a count-based window for cutting out seven pieces of data.

The data inputting module 501 receives an input of target data $(x_6, y_6)$.

At this point, target data $(x_5, y_5)$, which immediately precedes the input data in time-series order, has been stored in the data storing module 505. The data storing module 505 outputs the target data $(x_5, y_5)$ to the state value updating module 506 and, after a short time elapses since the input of target data $(x_6, y_6)$, updates the target data $(x_5, y_5)$ with the target data $(x_6, y_6)$.

When the target data $(x_6, y_6)$ is input, the state value updating module 506 uses the target data $(x_5, y_5)$, the state values $S(5)$, and the target data $(x_6, y_6)$ to calculate the state values $S(6)$. The state value updating module 506 outputs the state values $S(6)$ to the state value storing module 503.

At the time the target data $(x_6, y_6)$ is input, the state values $S(5)$ calculated from data that immediately precedes the input data in time-series order have been stored in the state value storing module 503. The state value storing module 503 is updated to the state values $S(6)$ after a short time elapses since the input of the state values $S(6)$ from the state value updating module 506.

The same updating processing is executed in a case where other pieces of target data are input.

The window data storing module 504 outputs expired data to the state value updating module 506. In the example of FIG. 7 where a count-based window for cutting out seven pieces of data is used, data turns into expired data for the first time in a case where data $(x_8, y_8)$ is input. The expired data, $(x_1, y_1)$, has been input prior to the data $(x_8, y_8)$ by seven pieces of data. The state value updating module 506 therefore uses mathematical expressions where the time difference $z_t$ is "0" to calculate the state values $S(t)$ until the data $(x_8, y_8)$ is input.

The processing procedure for time-based sliding window is described next.

In the case of time-based sliding window, the timing of inputting target data and the timing of inputting expired data differ from each other. The state value updating module 506 therefore needs to vary the calculation expression for updating processing depending on the type of input data.

Figure 8:
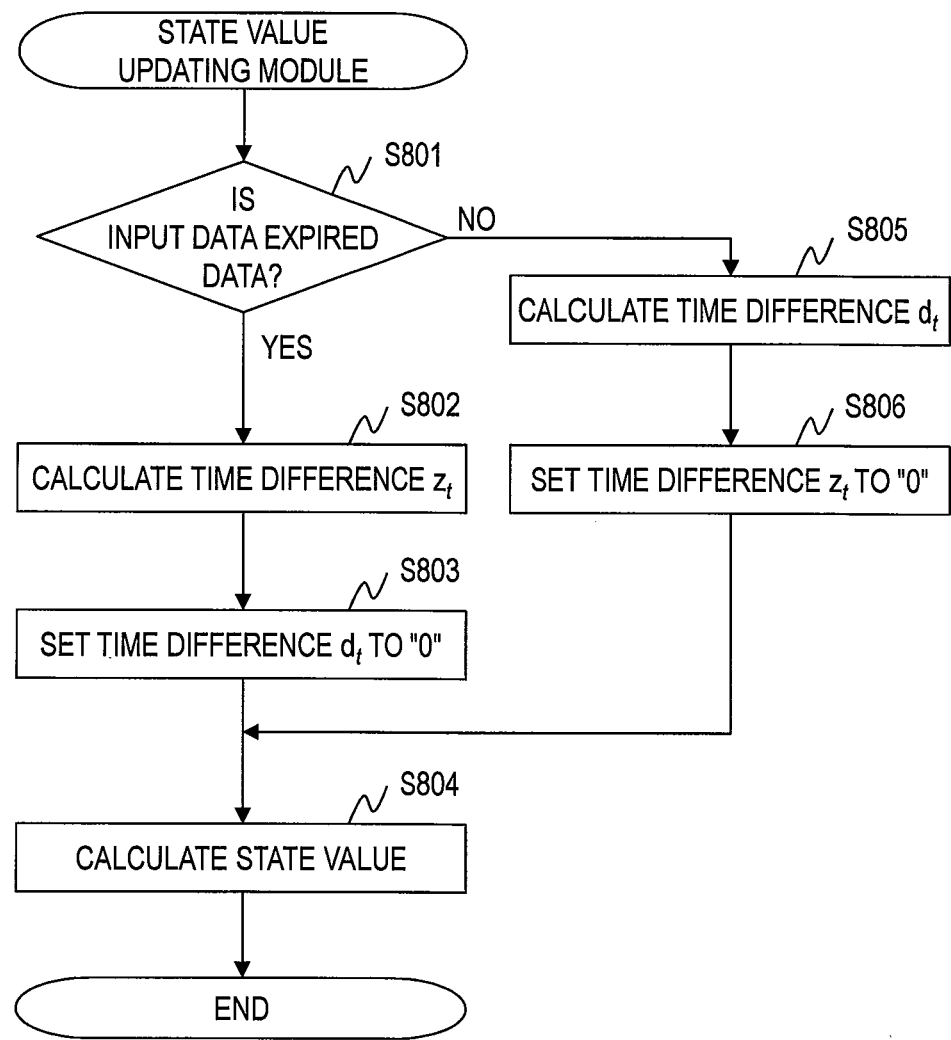
FIG. 8 is a flow chart illustrating processing that is executed by the state value updating module according to the embodiment of this invention.

FIG. 8 is a flow chart illustrating processing that is executed by the state value updating module 506 according to the embodiment of this invention.

The state value updating module 506 determines whether or not the input data is expired data (Step S801). The determining in this step is the same as in Step S602, and a description thereof is therefore omitted here.

In a case where the input data is determined as expired data, the state value updating module 506 calculates the time difference $z_t$ (Step S802), and sets the time difference $d_t$ to "0" (Step S803).

This is because, with no new data input, there is no need to move the time origin.

The state value updating module 506 substitutes the respective values in Expression (14) to Expression (17) to calculate the state values $S(t)$ (Step S804), and ends the processing.

In a case where it is determined that the input data is not expired data, in other words, in a case where the input data is target data, the state value updating module 506 calculates the time difference $d_t$ (Step S805), and sets the time difference $z_t$ to "0" (Step S806).

The state value updating module 506 substitutes the respective values in Expression (14) to Expression (17) to calculate the state values $S(t)$ (Step S803), and ends the processing.

The timing of updating data in the approximate expression calculating module 112 is described next.

Figure 9:
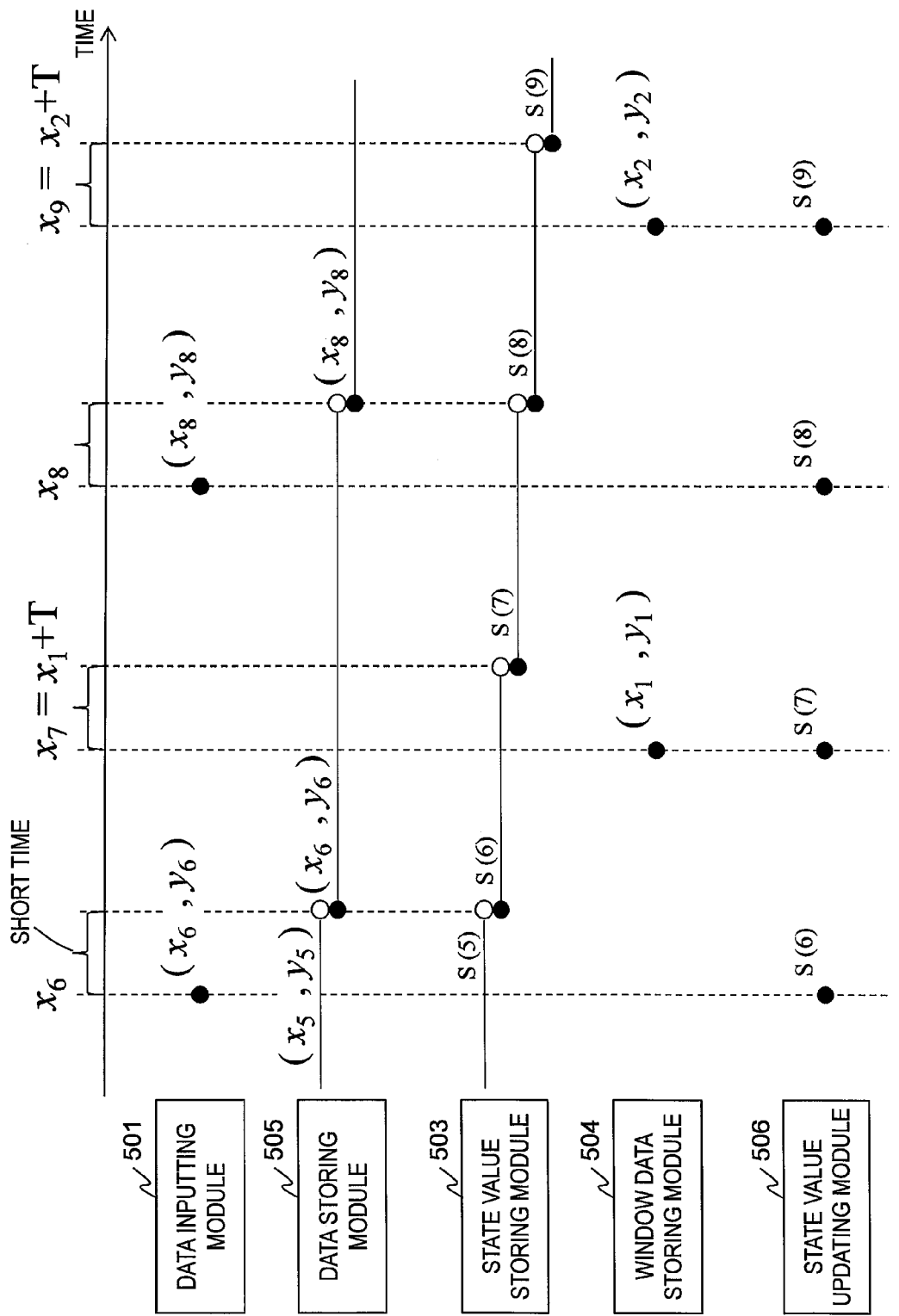
FIG. 9 is an explanatory diagram illustrating respective data updating timing of the component modules of the approximate expression calculating module according to the embodiment of this invention.

FIG. 9 is an explanatory diagram illustrating respective data updating timing of the component modules of the approximate expression calculating module 112 according to the embodiment of this invention.

The description given here takes as an example a case where the size of a time-based window is "T".

In time-based sliding window, the timing of inputting target data and the timing of inputting expired data differ from each other. However, the updating method of the data inputting module 501, the state value storing module 503, and the data storing module 505 is the same as in count-based sliding window, and a description thereof is therefore omitted here.

In the example of FIG. 9, no data turns into expired data at the time the target data ($x_5$, $y_5$) is input. The state value updating module 506 at this point executes Steps S805, S806, and S804 to calculate the state values S(6).

In a case where the time $x_7$ equals $x_1$+T, in other words, in a case where a time T which is the window size elapses since the input of data ($x_1$, $y_1$), the data ($x_1$, $y_1$) turns into expired data ($x_1$, $y_1$), and the expired data ($x_1$, $y_1$) is input to the state value updating module 506. The state value updating module 506 at this point executes Steps S802, S803, and S804 to calculate the state values S(7).

Modification Example

This invention is not limited to linear approximate expressions, and is also applicable to cases of approximation to a high-order polynomial.

For example, in the case of a quadratic approximate expression "$y=ax^2+bx+c$", coefficients a, b, and c can be obtained by solving a simultaneous equation expressed as Expression (20).

$$\begin{pmatrix} \sum x_i^4 & \sum x_i^3 & \sum x_i^2 \\ \sum x_i^3 & \sum x_i^2 & \sum x_i \\ \sum x_i^2 & \sum x_i & \sum 1 \end{pmatrix} \begin{pmatrix} a \\ b \\ c \end{pmatrix} = \begin{pmatrix} \sum x_i^2 y_i \\ \sum x_i y_i \\ \sum y_i \end{pmatrix} \quad (20)$$

In the case of an m-th order approximate expression, solutions of a simultaneous equation having the sum of powers of x and the sum of products of a power of x and y as coefficients are generally obtained. Here, a state value Sxm(t) which is the sum of m-th powers of x at the time $x_t$ is expressed by Expression (21). A state value Sxm(t−1) which is the sum of m-th powers of x at the time $x_{t−1}$ is then expressed by Expression (22).

$$S_{xm}(t) = \sum_{i=t-n+1}^{t} (x_i - x_t)^m \quad (21)$$

$$S_{xm}(t-1) = \sum_{i=t-n}^{t-1} (x_i - x_{t-1})^m \quad (22)$$

It is understood that the state value Sxm(t) can be calculated by incremental computation from the immediately preceding state value Sxm(t−1) as in the case of linear approximate expressions by transforming Expression (21) into Expression (23).

$$\begin{aligned} S_{xm}(t) &= \sum_{i=t-n}^{t-1} (x_i - x_t)^m + (x_t - x_t)^m - (x_{t-n} - x_t)^m \\ &= \sum_{i=t-n}^{t-1} \{(x_i - x_{t-1}) + d_t\}^m - z_t^m \\ &= \sum_{i=t-n}^{t-1} \sum_{k=0}^{m} \binom{m}{k}(x_i - x_{t-1})^k d_t^{m-k} - z_t^m \\ &= \sum_{k=0}^{m} \binom{m}{k} d_t^{m-k} S_{xk}(t-1) - z_t^m \end{aligned} \quad (23)$$

Similarly, an approximate expression can be calculated for the sum of products of a power of x and y with the use of Expression (24) and Expression (25). In other words, the approximate expression calculating module 112 can calculate coefficients of an m-th order polynomial by a recursive and incremental calculation method with the configuration of FIG. 5.

$$S_{yxm}(t) = \sum_{i=t-n+1}^{t} (x_i - x_t)^m y_i \quad (24)$$

$$S_{yxm}(t) = \sum_{k=0}^{m} \binom{m}{k} d_t^{m-k} S_{yxk}(t-1) - z_t^m y_{t-n} \quad (25)$$

In the expressions given above, m≥1 is satisfied, as well as Sx1(t)=Sx(t), Syx1(t)=Syx(t), Sx0(t)=n, and Syx0(t)=Sy(t).

According to a mode of this invention, a digit overflow can be prevented by moving the time origin in concert with the sliding of the window. In addition, recursive and incremental computation processing can be carried out by causing a small delay, in a case where target data and a state value are updated. This allows the approximate expression calculating module 112 to calculate an approximate expression at a reduced calculation cost.

The embodiment of this invention has now been described. However, the embodiment is merely an exemplification given to describe this invention, and the range of application of this invention is not limited to the exemplary mode alone. Any combination of the embodiments described above can also constitute an embodiment of this invention.

What is claimed is:

1. A stream data processing server for processing stream data, which arrives consecutively from a computer system as a monitoring target, comprising:
    a processor;
    a memory coupled to the processor;
    a storage medium coupled to the processor; and
    an interface coupled to the processor, for coupling to other devices,
    the stream data including a plurality of pieces of data to which time stamps are added,
    the stream data processing server further comprising a stream data processing module for cutting the plurality of pieces of data that are included within a processing range as a target out of the stream data by using a sliding window in accordance with a query registered in advance, and executing analyzing processing for the cut out plurality of pieces of data,
    the stream data processing module having:
        an approximate expression calculating module for calculating, by using the cut out plurality of pieces of data, an approximate expression that indicates an association relation between the time stamps and values of the plurality of pieces of data; and
        an anomaly detecting module for calculating predicted values of the plurality of pieces of data by using the calculated approximate expression, and predicting an anomaly in the computer system based on the calculated predicted values,
    the approximate expression calculating module being configured to:
        determine one of the time stamps of the cut out plurality of pieces of data as a time origin;

modify the time stamps of the cut out plurality of pieces of data to relative time values in relation to the determined time origin; and use the modified time stamps and the values of the plurality of pieces of data to calculate the approximate expression, wherein the approximate expression calculating module uses a least square method to calculate the approximate expression, wherein the approximate expression calculating module includes:

an input module for receiving an input of the cut out plurality of pieces of data;

a data storing module for storing the plurality of pieces of data received by the input module;

a statistics calculating module for calculating statistics that are used to calculate coefficients of the approximate expression based on the cut out plurality of pieces of data;

a statistics storing module for storing the calculated statistics; and a coefficient calculating module for calculating the coefficients of the approximate expression by using the statistics, and wherein, the statistics calculating module uses first statistics, which are calculated based on one of the plurality of pieces of data that has been input before first data is input, and the first data to calculate second statistics, in a case where the input module receives an input of the first data.

2. The stream data processing server according to claim 1, wherein the input module is configured to:

output the first data to the statistics calculating module immediately after receiving the first data; and output the first data to the data storing module after a short time elapses since the reception of the first data, wherein the data storing module stores the first data after outputting, to the statistics calculating module, the one of the plurality of pieces of data that has been input immediately before the first data is input, wherein the statistics calculating module is configured to:

output the calculated second statistics to the coefficient calculating module immediately after calculating the second statistics; and output the calculated second statistics to the statistics storing module after a short time elapses since the second statistics are calculated, and wherein the statistics value storing module stores the calculated second statistics after outputting the first statistics to the statistics calculating module.

3. The stream data processing server according to claim 2, wherein the approximate expression calculating module is configured to:

when n pieces of data out of the plurality of pieces of data that have $x_{t-n+1}$ to $x_t$ as the time stamps are used to calculate a linear expression "y=ax+b", which indicates a relation between values y of the plurality of pieces of data and the time stamps denoted by x, determine the time stamp $x_t$ that is closest to a current time as the time origin;

calculate the statistics expressed by Expression (1), Expression (2), Expression (3), and Expression (4); and use Expression (5) and Expression (6) to calculate coefficients a and b of the linear expression:

$$S_x(t) = \sum_{i=t-n+1}^{t} (x_i - x_t) \quad (1)$$

$$S_y(t) = \sum_{i=t-n+1}^{t} y_i \quad (2)$$

$$S_{x2}(t) = \sum_{i=t-n+1}^{t} (x_i - x_t)^2 \quad (3)$$

$$S_{yx}(t) = \sum_{i=t-n+1}^{t} (x_i - x_t) y_i \quad (4)$$

$$a(t) = \frac{nS_{yx}(t) - S_x(t)S_y(t)}{nS_{x2}(t) - S_x(t)^2} \quad (5)$$

$$b(t) = \frac{S_{x2}(t)S_y(t) - S_{yx}(t)S_x(t)}{nS_{x2}(t) - S_x(t)^2}. \quad (6)$$

4. The stream data processing server according to claim 3, wherein the statistics storing module stores one of the first statistics that has $x_{t-1}$ as the time stamp, and wherein, in a case where the input module receives an input of a piece of the first data that has $x_t$ as a value of the time stamp, the statistics calculating module calculates the second statistics by using Expression (7), Expression (8), Expression (9), Expression (10), Expression (11), and Expression (12):

$$S_x(t)=S_x(t-1)+d_t-z_t \quad (7)$$

$$S_{x2}(t)=S_{x2}(t-1)+2d_tS_x(t-1)+nd_t^2-z_t^2 \quad (8)$$

$$S_{yx}(t)=S_{yx}(t-1)+d_tS_y(t-1)-z_ty_{t-n} \quad (9)$$

$$S_y(t)=S_y(t-1)+y_t-y_{t-n} \quad (10)$$

$$d_t=x_{t-1}-x_t \quad (11)$$

$$z_t=x_{t-n}-x_t \quad (12).$$

5. The stream data processing server according to claim 4, wherein the approximate expression calculating module is configured to:

in a case where the processing range is changed, determine whether there is expired data, which is a piece of data among the plurality of pieces of data that is contained within the processing range before the change but is not contained in the processing range after the change; and in a case where it is determined that there is no expired data, use Expression (7), Expression (8), and Expression (9) where $z_t$ is 0 to calculate the second statistics.

6. A non-transitory computer-readable storage medium storing a stream data processing program, when executed on a computer, causing the computer to process stream data arriving consecutively from a computer system as a monitoring target, the computer including:

a processor;

a memory coupled to the processor;

a storage medium coupled to the processor; and an interface coupled to the processor, for coupling to other devices, the stream data including a plurality of pieces of data to which time stamps are added, the memory storing query definition information, which is registered in advance, the stream data processing program causing the processor to execute:

a first step of cutting the plurality of pieces of data that are included within a processing range as a target out of the stream data by using a sliding window in accordance with the query definition information;

a second step of calculating, by using from the cut out plurality of pieces of data, an approximate expression that indicates an association relation between the time stamps and values of the plurality of pieces of data; and a third step of calculating predicted values of the plurality of pieces of data by using the calculated approximate expression, and predicting an anomaly in the computer system based on the calculated predicted values, the second step including:

determining one of the time stamps of the cut out plurality of pieces of data as a time origin;

modifying the time stamps of the cut out plurality of pieces of data to relative time values in relation to the determined time origin; and using the modified time stamps and the values of the plurality of pieces of data to calculate the approximate expression, wherein the stream data processing program controls the processor so that the processor executes calculating the approximate expression by using a least square method, wherein the stream data processing program comprises:

input means for receiving an input of the plurality of pieces of data;

data storing means for storing the plurality of pieces of data received by the input module;

statistics calculating means for calculating statistics that are used to calculate coefficients of the approximate expression based on the cut out plurality of pieces of data;

statistics storing means for storing the calculated statistics; and coefficient calculating means for calculating the coefficients of the approximate expression by using the statistics, and wherein, in a case where the input means receives an input of first data, the second step includes controlling the statistics calculating means so that the statistics calculating means executes calculation of second statistics by using first statistics, which are calculated based on all of the plurality of pieces of data that have been input before the input of the first data is received, and the first data.

7. The non-transitory computer-readable storage medium storing the stream data processing program according to claim 6, wherein the input means executes outputting of the first data to the statistics storing means immediately after receiving the first data, and outputting of the first data to the data storing means after a short time elapses since the reception of the first data, wherein the data storing means executes storing of the first data after outputting, to the statistics calculating means, one of the plurality of pieces of data that has been input immediately before the first data is input, wherein the statistics calculating means executes outputting of the calculated second statistics to the coefficient calculating means immediately after calculating the second statistics, and outputting of the calculated second statistics to the statistics storing means after a short time elapses since the second statistics are calculated, and wherein the statistics value storing means executes outputting of the first statistics to the statistics calculating means and subsequent storing of the calculated second statistics.

8. The non-transitory computer-readable storage medium storing the stream data processing program according to claim 7, wherein the second step includes controlling the approximate expression calculating means so that the approximate expression calculating means executes:

in a case where n pieces of data out of the plurality of pieces of data that have $x_{t-n+1}$ to $x_t$ as the time stamps are used to calculate a linear expression "y=ax+b", which indicates a relation between values y of the plurality of pieces of data and the time stamps denoted by x, determining the time stamp $x_t$ that is closest to a current time as the time origin;

calculating the statistics expressed by Expression (13), Expression (14), Expression (15), and Expression (16); and using Expression (17) and Expression (18) to calculate coefficients a and b of the linear expression:

$$S_x(t) = \sum_{i=t-n+1}^{t} (x_i - x_t) \tag{13}$$

$$S_y(t) = \sum_{i=t-n+1}^{t} y_i \tag{14}$$

$$S_{x2}(t) = \sum_{i=t-n+1}^{t} (x_i - x_t)^2 \tag{15}$$

$$S_{yx}(t) = \sum_{i=t-n+1}^{t} (x_i - x_t) y_i \tag{16}$$

$$a(t) = \frac{n S_{yx}(t) - S_x(t) S_y(t)}{n S_{x2}(t) - S_x(t)^2} \tag{17}$$

$$b(t) = \frac{S_{x2}(t) S_y(t) - S_{yx}(t) S_x(t)}{n S_{x2}(t) - S_x(t)^2}. \tag{18}$$

9. The non-transitory computer-readable storage medium storing the stream data processing program according to claim 8, wherein, in a case where the statistics storing means stores one of the first statistics that has $x_{t-1}$ as a time stamp, and in a case where the input means receives an input of a piece of the first data that has $x_t$ as a value of the time stamp, the statistics calculating means executes calculating the second statistics by using of Expression (19), Expression (20), Expression (21), Expression (22), Expression (23), and Expression (24):

$$S_x(t) = S_x(t-1) + d_t - z_t \tag{19}$$

$$S_{x2}(t) = S_{x2}(t-1) + 2 d_t S_x(t-1) + n d_t^2 - z_t^2 \tag{20}$$

$$S_{yx}(t) = S_{yx}(t-1) + d_t S_y(t-1) - z_t y_{t-n} \tag{21}$$

$$S_y(t) = S_y(t-1) + y_t \tag{22}$$

$$d_t = x_{t-1} - x_t \tag{23}$$

$$z_t = x_{t-n} - x_t. \tag{24}$$

10. The non-transitory computer-readable storage medium storing the stream data processing program according to claim 9, wherein the second step comprises controlling the approximate expression calculating means so that the approximate expression calculating means executes:

in a case where the processing range is changed, determining whether or not there is expired data, which is a piece of data among the plurality of pieces of data that is included within the processing range before the change but is not included in the processing range after the change; and in a case where it is determined that there is no expired data, using Expression (19), Expression (20), and Expression (21) where $z_t$ is 0 to calculate the second statistics.

* * * * *